May 21, 1963  E. L. HILLIER  3,090,763
DRY BLENDING VINYL RESIN
Filed Jan. 25, 1960
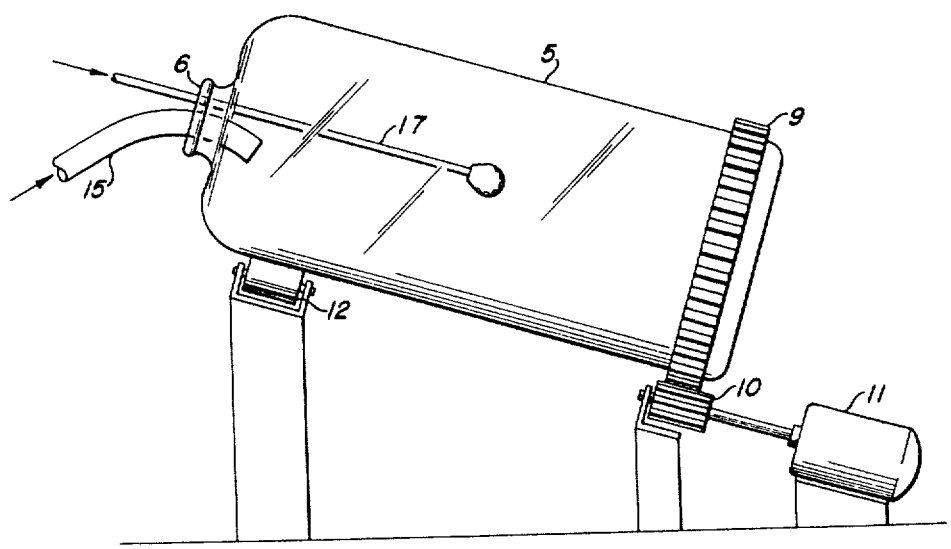
INVENTOR
EDWARD L. HILLIER
BY
ATTORNEY … # 3,090,763
DRY BLENDING VINYL RESIN
Edward L. Hillier, Cuyahoga Falls, Ohio, assignor to The United States Stoneware Company, Tallmadge, Ohio, a corporation of Ohio
Filed Jan. 25, 1960, Ser. No. 4,406
4 Claims. (Cl. 260—23)

This invention relates to an improved process of using a powdered additive with a plasticized vinyl resin to produce a free-flowing powder, known as a dry blend.

Dry blends have been on the market for some time. Only certain types of vinyl resins and certain plasticizers have been usable in their production. When a powdering additive (described in detail hereinafter) is added to a damp, particulate mass of any extrusion grade of plasticized pearl-type vinyl resin (as hereinafter explained), the resin-plasticizer blend becomes free flowing. A blend is free flowing if it has a flow rate of at least 5 cc. per second by equipment described in ASTM D–392–38 (apparent density test). The rate of flow as there described is referred to herein, and particularly in Table V, as the "dry blend flow."

The powdering additive may be any one or more very finely divided solid materials of a large class which comprises both organic and inorganic compounds. These will be described hereinafter.

There have been various disadvantages or limitations inherent in the prior methods of producing free-flowing blends, primarily because it has been possible to use only certain resins and certain plasticizers in producing them. In the process of this invention, any pearl-type resin and any plasticizer can be used.

Furthermore, the dry blends of the prior art have not been too satisfactory. The extrudates obtained from them have often been porous, of high "fish eye" content and rough surfaced, due to inadequate densification of the resin-plasticizer mass in the extruder. This can be overcome by increasing the length of the extruder working chamber or by using a higher internal working pressure. Such remedies increase the cost per unit output.

According to this invention such difficulties are overcome. The resin-plasticizer product treated with the powdering additive has a higher bulk density than that of the prior art materials. It approaches the theoretical which is the specific gravity of the product. The increase in bulk density of the dry blends obtained by the process of this invention will be illustrated by examples, in what follows.

The vinyl resins used in carrying out the invention include both homopolymers of vinyl chloride and copolymers of vinyl chloride and any one of the many monomers with which vinyl chloride has been copolymerized to produce a resin. Such monomers include, for example, vinyl acetate, vinylidene chloride, diethyl maleate, etc. The term "polymer" is used herein to include homopolymers and copolymers of vinyl chloride.

Many liquid plasticizers have been used with vinyl resins. The following are listed merely as illustrative:

Dimethyl phthalate
Diethyl phthalate
Dimethoxy ethyl phthalate
Dibutyl phthalate
Butyl cyclohexyl phthalate
Butyl benzyl phthalate
Dibutoxy ethyl phthalate
Di-2-ethylbutyl phthalate
Bis(diethylene glycol monoethyl ether)phthalate
Di-n-hexyl phthalate
Di-2-ethylhexyl phthalate
Diiso-octyl phthalate
Di-2-ethylhexyl hexahydrophthalate
Tri-n-butyl phosphate
Tributoxyethyl phosphate
Cresyl diphenyl phosphate
2-ethylhexyl diphenyl phosphate
Tricresyl phosphate
Di-n-hexyl adipate
Di-butyl-2-ethoxyethyl adipate
Di-2-ethylhexyl adipate
Diiso-octyl adipate
Octyl decyl adipate
Butyl phthallyl butyl glycollate
Ethyl phthallyl ethyl glycollate
Di-n-butyl sebacate
Di-2-ethylhexyl sebacate
Di-2-ethylhexyl azelate
Methoxyethyl acetyl ricinoleate
Polyglycol di-2-ethylhexanoate
Polyesters of dibasic acids and diols (known as different grades of Paraplex and manufactured by Rohm & Haas Co.)
Chlorinated paraffin
Epoxidized soya oil
Tetra-n-butyl thio disuccinate
Bis(dimethyl benzyl)ether Any of these and any other plasticizer can be used in carrying out the invention.

The plasticizer is mixed with the resin after the resin has been heated, or while heat is being transferred to the resin to assist solvation. The plasticizer may be heated before being added to the resin. After plasticizing and preferably after cooling, the powdering additive is added to the plasticized resin, and this is all done in the same vessel as a part of one continuous operation.

The term "powdering additives" is used herein to refer to solids as defined in this paragraph. Whether organic or inorganic, the powdering additive is so finely divided that it passes through a 150-mesh screen. If of an inorganic composition, the powdering additives are amorphous as distinguished from crystalline, and this distinction can be determined visually or microscopically. Inorganic powdering additives are no more than one-tenth percent soluble in either hot or cold water. The organic powdering additives are generally less than about 5 percent soluble in the plasticizer being utilized in the blend. Although the powdering additive is not mixed with the plasticizer, if organic it is of such a nature that upon dispersing 5 parts (by weight) of the additive in 100 parts of the plasticizer employed, there is no evidence of settling, the additive being fine enough to form a homogeneous, stable, opaque dispersion in the plasticizer.

The following table lists many materials of very different chemical compositions which were effective as powdering additives, and others that were not satisfactory in the concentrations used. The different powdering additives were tested in this formula:

| | Parts by weight |
|---|---|
| Marvinol VR–24 | 100.0 |
| Butyl phthallyl butyl glycollate | 75.0 |
| Tin stabilizer | 1.0 |
| Ultramarine blue | 0.1 |

The first column gives the water solubility for inorganic additives and the plasticizer dispersibility of organic additives as Sol. (soluble or dispersible), Ins. (insoluble or non-dispersible), Sl. Sol. (slightly soluble or dispersible), V. Sl. Sol. (very slightly soluble, dispersible) and Disp. (stable, opaque dispersion). The second column indicates the concentration in which the material was employed in percentage, based on the weight of the vinyl polymer. The next column indicates whether or not the added material was effective as a powdering additive, the various materials in the concentrations used being rated as E (excellent), G (good), F (fair), P (poor) and B (bad). Those rated F, G or E have flow rates in excess of 5 cc. per second. The list is not intended to be complete.

MATERIALS TESTED AS POWDERING ADDITIVES

| Inorganics | Water solubility | Concentration used (percent) | Efficiency |
|---|---|---|---|
| SALTS | | | |
| $MgCl_2$ | Sol | 24 | B |
| $KCl$ | Sol | 24 | B |
| $NaCl$ | Sol | 24 | B |
| $BaCl_2.2H_2O$ | Sol | 24 | B |
| $HgCl_2$ | Ins | 24 | B |
| $PbCl_2$ | Ins | 24 | B |
| $PbI_2$ | Ins | 24 | B |
| $PbF_2$ | Ins | 24 | B |
| $PbSO_4$ | Ins | 16 | G |
| $BaSO_4$ | Ins | 16 | G |
| $MgSO_4$ | Sol | 24 | F |
| $CuSO_4$ | Sol | 24 | P |
| $Fe_2(SO_4)_3$ | Sol | 24 | P |
| $FeSO_4$ | Sol | 24 | P |
| $CaSO_4$ | Ins | 16 | G |
| $NaHCO_3$ | Sol | 24 | B |
| $Na_2CO_3$ | Sol | 24 | F |
| $CaCO_3$ | Ins | 4 | E |
| $CdCO_3$ | Ins | 4 | E |
| $BaCO_3$ | Ins | 4 | E |
| $KNO_3$ | Sol | 24 | B |
| $Ca_3(PO_4)_2$ | Ins | 4 | E |
| $CrPO_4.4H_2O$ | Sl. sol | 24 | B |
| $Na_2HPO_4$ | Sol | 24 | B |
| $Na_3PO_4.12H_2O$ | Sol | 24 | B |
| $Al_2(PO_4)_3$ (polymer) | Ins | 4 | G |
| $NH_4H_2PO_4$ | Sol | 24 | B |
| $K_4P_2O_7$ | Sol | 24 | B |
| $PbCrO_4$ | Ins | 4 | G |
| $KCrO_4$ | Sol | 24 | B |
| Asbestine $3x(MgSiO_3)$ | Ins | 8 | E |
| Kaolin $(H_2Al_2Si_2O_8.H_2O)$ | Ins | 4 | E |
| MICA $(Al_2(SiO_3)_3)$ | Ins | 8 | E |
| Ultramarine blue | Ins | 4 | E |
| Ultrox $ZrSiO_4$ | Ins | 4 | E |
| OXIDES | | | |
| Celite $(SiO_2)$ | Ins | 8 | E |
| Ground sand | Ins | 24 | B |
| Powdered glass | Ins | 24 | B |
| Santocel C | Ins | 4 | E |
| Litharge PbO | Ins | 24 | P |
| $Sb_2O_3$ | V. sl. sol | 4 | E |
| $CuO$ | Ins | 24 | B |
| $ZnO$ | Ins | 4 | E |
| $Fe_2O_3.H_2O$ | Ins | 4 | E |
| $Fe_3O_4$ | Ins | 4 | E |
| $TiO_2$ (anatase) | Ins | 4 | E |
| $MgO$ | Ins | 4 | E |
| $TiO_2$ (rutile) | Ins | 4 | E |
| $Pb_3O_4$ (red lead) | Ins | 4 | E |
| $Cr_2O_3$ | Ins | 4 | E |
| $MnO_2$ | Ins | 24 | P |
| $As_2O_3$ | Sl. sol | 24 | B |
| $CrO_3$ | Sol | 24 | B |
| $SnO$ | Ins | 24 | B |
| $PbO_2$ | Ins | 24 | B |
| $BaO$ | Ins | 24 | B |
| $MoO_3$ | Sl. sol | 24 | F |
| $Hg_2O$ | Ins | 24 | F |
| $CaO$ | Ins | 24 | F |
| $Cu_2O$ | Ins | 24 | F |
| $As_2O_5$ | Sol | 24 | F |
| $Co_2O_3$ | | 24 | F |
| $ZrO_2$ | Ins | 4 | E |
| $Al_2O_3$ | Ins | 4 | E |
| ELEMENTS | | | |
| Graphite | Ins | 24 | B |
| Copper powder | Ins | 24 | B |
| Rhombic sulfur | Ins | 24 | B |
| Iron powder | Ins | 24 | B |
| Aluminum powder | Ins | 8 | F-G |
| Lamp black | Ins | 4 | E |

MATERIALS TESTED, ETC.—Continued

| Organics | Plasticizer dispersibility | Concentration used (percent) | Efficiency |
|---|---|---|---|
| SOAPS | | | |
| Aluminum stearate | Disp | 24 | F |
| Calcium stearate | Disp | 4 | F |
| Barium stearate | Disp | 4 | F |
| Cadmium stearate | Disp | 20 | F |
| Lead stearate | Disp | 4 | F |
| COLORS | | | |
| Phthalocyanine green | Disp | 4 | E |
| Phthalocyanine blue | Disp | 4 | E |
| Diphenyl thiocarbazone | Disp | 4 | E |
| Grasol red (azo dye) | Sol | 12 | P |
| O-cresol phthalein | Disp | 8 | E |
| RESINS | | | |
| Bakelite VYNV-2 | Disp | 4 | E |
| PVC, Escambia 2250 | Ins | 24 | B |
| PVC, Dow 100-4 | Ins | 24 | B |
| PVC, Geon 121 | Disp | 4 | E |
| PVC, Opalon 410 | Disp | 4 | E |
| PVC, Exon 654 | Disp | 4 | E |
| PVC, Marvinol VR-50 | Disp | 4 | E |
| PVC, Marvinol VR-10 | Sl. Ins | 12 | F |
| Saran A | Ins | 24 | B |
| Epon 1009 | Ins | 24 | B |
| Ethyl cellulose | Ins | 24 | B |
| Pliovic AO | Disp | 4 | E |
| MISCELLANEOUS | | | |
| Hydroquinone | Sol | 12 | B |
| Gallic acid | Ins | 12 | B |
| Citric acid | Ins | 12 | B |
| Citric acid, anhydrous | Ins | 12 | B |
| Pyrogallic acid | Sl. sol | 12 | B |
| p-Hydroxybenzoic acid | Sol | 12 | B |
| b-Oxynaphthoic acid | Ins | 12 | B |
| Cyanuric acid | Ins | 12 | B |
| p-Dibenzyloxy benzene | | 12 | B |
| o-Phthalic acid | Ins | 12 | B |
| Ascorbic acid | Ins | 12 | B |
| Sebacic acid | Ins | 12 | B |
| Diphenyl carbonate | Sol | 12 | B |
| Hydroxylamine hydrochloride | Ins | 12 | B |
| Glucose | Ins | 12 | B |
| Coumarin | Sol | 12 | B |
| Resorcinol | Ins | 12 | B |
| Benzil | Sol | 12 | B |
| Diphenyl | Sol | 12 | B |
| Pentaerythritol | Disp | 12 | G |
| Hexamethylenetetramine | Ins | 12 | B |
| Beta naphthol | Sol | 12 | B |
| Benzophenone | Sol | 12 | B |
| Bisphenol A | Sol | 12 | B |
| Tetrachloro bisphenol A | | 12 | B |
| Ethylene diamine tetraacetic acid | | 12 | B |
| Soluble starch | Ins | 12 | B |
| Fumaric acid | Ins | 12 | B |
| Acetamid | Sl. sol | 12 | B |
| Urea | Ins | 24 | B |
| Sugar, granulated | Ins | 24 | B |
| Sugar, powdered XXX | Disp | 16 | F |
| Glycol titanates | Disp | 4 | E |

According to this invention the plasticizer is added to the resin as it is being agitated by movement of the vessel containing the resin, and heat is supplied to cause absorption of the plasticizer in the resin. Then as a part of the same operation, the resin is preferably cooled, as by contact with a gas which is cooler than the resin. The resin should be cooled to a temperature above room temperature and below about 250° F. The powdering additive is then added, still as a part of the same operation.

Stabilizers, coloring materials, etc. can be incorporated with the resin or plasticizer, or both, in any usual manner. Dry compounding ingredients may be mixed into the resin before adding the plasticizer. Dry pigments may be mixed as a powder with the finely divided resin without being dissolved therein. Liquids may be added to the plasticizer, and finely divided solid compounding ingredients may be suspended in the plasticizer before it is mixed with the resin. Usually liquid compounding ingredients will be added to the plasticizer to insure uniform distribution throughout the resin. A finely divided compounding ingredient other than the powdering additive may be mixed with the free-flowing resin after the powdering additive has been added to it, or such a compounding ingredient may be mixed with the powdering additive before it is mixed with the resin.

The pearl-type vinyl resins that can be used in carrying out this invention, include the first three of the following four types of resins all of which are referred to herein as extrusion grades to distinguish them from Type No. 4 which includes resins all of which are soluble (about 20 percent) at room temperature in active solvents such as methyl ethyl ketone and are used as solution resins in paint and lacquer formulations. These types of resins do not include emulsion-polymerized, dispersion-grade paste resins.

*Type No. 1.*—This type of resin is available as large agglomerates that are relatively porous. The polymer is made by the suspension or pearl process. Thirty to 100 percent of the agglomerates is retained on an 80- to 100-mesh screen. Seventy percent of an average material is retained on an 80-mesh screen. The bulk density of such agglomerates runs from 0.450 to 0.500 gram per cc. Microscopic examination shows these resin agglomerates to be spherical, dull, white and smooth. This type of resin has been used in producing dry blends, as disclosed in the prior art.

*Type No. 2.*—This type of resin, also made by the pearl or suspension method, has most of the general characteristics of the former type. The particles are extremely large and differ from Type No. 1 in that (1) the agglomerates are retained 100 percent on an 80-mesh screen, and (2) their bulk density is higher, ranging up to 0.550 gram per cc. They have a high capacity for absorption of plasticizer and the plasticized resin can be truly free flowing. This type of resin has been used in the production of dry blends, according to the prior art.

*Type No. 3.*—This type of resin is known as a cold-blend resin and is made by the pearl or suspension method. The agglomerates are small and they absorb large amounts of plasticizer. The bulk density is in the range of 0.3 to 0.35 gram per cc. These resins are usually mixed cold, i.e. plasticizer is added without heating. When plasticized they are not free-flowing.

*Type No. 4.*—This type is limited to the solution-grade resins. On microscopic examination they are dense, glassy particles rather than spongy, dull particles. They are of such small particle size that no less than 20 percent will pass through a 120-mesh screen. They include (1) copolymers of vinyl chloride with at least about 10 to 15 percent of vinyl acetate or vinylidene chloride and (2) homopolymers of vinyl chloride of low molecular weight and an intrinsic viscosity of no more than about 0.80. They can be made by different processes and when made by the pearl or suspension type process, and only when so made, may be utilized in carrying out this invention.

Reference will be made herein to various commercial resins and they will be identified by their trade names. Those that are listed immediately below are all made by the pearl or suspension process and are identified under the name of the manufacturer of each. Each of the following is a polyvinyl chloride homopolymer unless otherwise identified.

The Dow Chemical Co.:
  Dow 100-4—Type 1
  Dow 111-4—Type 1

Escambia Chemical Corporation:
  Escambia 1185—Type 1—low molecular weight
  Escambia 1200—Type 1
  Escambia 1225—Type 1
  Escambia 1250—Type 1
  Escambia 2200—Type 2
  Escambia 2225—Type 2
  Escambia 2250—Type 2

The Firestone Tire & Rubber Company:
  Exon 915—Type 1
  Exon 925—Type 1.
  Exon 666—Type 1—low molecular weight
  Exon 402—Type 1—low molecular weight The Goodyear Tire & Rubber Company:
  Pliovic S-50—Type 1—low molecular weight
  Pliovic K-90—Type 1

The B. F. Goodrich Company:
  Geon 101 EP—Type 1
  Geon 118—Type 3
  Geon 101—Type 1
  Geon 101 EPF 21—Type 1
  Geon 202—Copolymer of vinyl chloride and vinylidene chloride Union Carbide Corporation: VYNW-6—Type 3—Copolymer of vinyl chloride and vinyl acetate General Tire & Rubber Company:
  Vygen 105—Type 1
  Vygen 120—Type 1
  Vygen 161—Type 3

Naugatuck Chemical Company:
  Marvinol VR-24—Type 1
  Marvinol VR-33—Type 3
  Marvinol MX-2401—Type 1—low molecular weight
  Marvinol VR-26—Type 1—low molecular weight Monsanto Chemical Company: Opalon 300 FM—Type 1

Diamond Alkali Company:
  Diamond PVC-450—Type 1
  Diamond DX-35—Type 1—low molecular weight
  Diamond DX-30—Type 1—low molecular weight
  Diamond 500—Type 1

Rubber Corporation of America:
  Insular 155—Type 1—low molecular weight
  Insular 200—Type 1

J. P. Frank Chemical Co.:
  Presto 315-40—Type 1
  Presto 325-40—Type 1
  Presto 402-40—Type 1—low molecular weight Thompson Chemical Company: Trulon 520—Type 1—low molecular weight The following tables give properties of various resins.

TABLE I

*General Properties of Various Vinyl Resins*

| Resin | Intrinsic viscosity | Dispersion parameter | Bulk density | Surface area, sq. cm./g. | Particle size, cm. | Dry blend characteristics ||| 
|---|---|---|---|---|---|---|---|---|
| | | | | | | Temp., °F. | Mix | Flow |
| Dow 100-4 | 1.22 | .329 | .465 | 142 | .0153 | 212 | Good | G |
| Geon 101 | 1.21 | 1.026 | .501 | 174 | .0115 | 212 | Fair | P |
| Escambia 1250 | 1.17 | .184 | .499 | 115 | .0174 | 212 | Good | G |
| Escambia 2250 | 1.17 | V. low | .460 | 123 | .0177+ | 212 | Good | G |
| Vygen 120 | 1.16 | .344 | .163 | 165 | .0123 | 212 | Fair | G |
| Opalon 300FM | 1.13 | .440 | .433 | 173 | .0134 | 212 | Good | G |
| Diamond 500 | xxxx | .374 | .483 | 169 | .0123 | 212 | Good | G |
| Dow 111-4 | 1.03 | .417 | .468 | 123 | .0163 | 212 | Good | G |
| Vygen 161 | 1.02 | .451 | .283 | 346 | .0102 | 212 | Poor | P |
| Presto P315-40 | 1.02 | .533 | .488 | 171 | .0120 | 212 | Good | P |
| Diamond 450 | xxxx | .419 | .496 | 148 | .0136 | 212 | Good | P |
| Exon 915 | 1.01 | .972 | .492 | 192 | .0106 | 212 | Good | P |
| Escambia 2225 | 1.00 | V. low | .537 | 105 | .0177+ | 212 | Good | G |
| Escambia 1225 | 1.00 | .205 | .508 | 119 | .0163 | 190 | Good | G |
| Geon 118 | xxxx | 1.020 | .343 | 304 | .0096 | 212 | Bad | P |
| VYNW-6 | xxxx | .433 | .304 | 339 | .0097 | 212 | Good | P |
| Pliovic K-90 | xxxx | .206 | .489 | 128 | .0160 | 212 | Good | G |
| Escambia 1200 | .95 | .294 | .557 | 110 | .0163 | 212 | Good | G |
| Escambia 2200 | .95 | V. low | .497 | 114 | .0177+ | 190 | Good | G |
| Presto P325-40 | .95 | .400 | .492 | 200 | .0102 | 190 | Good | P |
| Vygen 105 | .93 | .534 | .454 | 213 | .0103 | 190 | Fair | P |
| Marvinol VR-34 | .88 | .640 | .341 | 211 | .0139 | 190 | Fair | P |
| Exon 402 | .88 | 1.143 | .576 | 166 | .0105 | 190 | Poor | P |
| Presto P402-40 | .83 | .583 | .547 | 178 | .0103 | 170 | Fair | P |
| Diamond DX-35 | xxxx | .604 | .615 | 109 | .0149 | 170 | Good | P |
| Geon 202 | xxxx | .872 | .615 | 130 | .0125 | 190 | Poor | P |
| Escambia 1185 | xxxx | .355 | .613 | 116 | .0141 | 212 | Fair | P |
| Insular 200 | xxxx | .617 | .480 | 219 | .0094 | 190 | Fair | P |
| Marvinol VR-24 | .76 | .877 | .538 | 206 | .0090 | 212 | Fair | P |
| Marvinol MX-2401 | .76 | .606 | .541 | 234 | .0079 | 190 | Bad | P |
| Pliovic 8-50 | .72 | .923 | .524 | 233 | .0082 | 190 | Fair | P |
| Marvinol VR-26 | .71 | .671 | .588 | 175 | .0097 | 170 | Bad | P |
| Diamond DX-30 | xxxx | 1.138 | .606 | 120 | .0138 | 170 | Bad | P |

The intrinsic viscosity was determined according to ASTM D-1243-58T. The dispersion parameter defines the spread of the particle size by a single number instead of a curve; the smaller the number, the more uniform the particle size. The bulk density of the resin is given in grams per cubic centimeter as determined by ASTM D-392-38. These values vary somewhat from batch to batch. The dry-blend flow is defined as G (good) or P (poor). The recorded dry-blend characteristics are based on prior art.

Table II gives data on blends of the following formula:

|  | Parts by weight |
|---|---|
| Resin | 100.0 |
| Butyl phthallyl butyl glycollate | 75.0 |
| Tin stabilizer | 1.0 |
| Ultramarine blue | 0.1 |
| Titanium dioxide | 3.0 |

The purpose is to show the wide range of fusion temperatures and the melt flows of the resins to which the invention pertains. The melt flow was a visual observation of the ease with which the blend melted and spread out at 430° F. in an air oven.

The following letters are used to compare the melt flow characteristics: E, Excellent; G, Good; F, Fair; P, Poor; B, Bad.

No powdering additive was used in making these determinations.

TABLE II

*Fusion Temperature and Melt Flow of Dry Blends*

| Resin | Fusion temperature, °F. Kofler hot bench | Melt Flow at 430° F. (air oven) |
|---|---|---|
| Dow 100-4 | 197 | B. |
| Geon 101 | 190 | B. |
| Opalon 300 FM | 190 | B. |
| Marvinol VR-24 | 164 | E. |
| Exon 915 | 182 | P. |
| Marvinol VR-26 | 168 | E. |
| Marvinol MX-2401 | 185 | E. |
| Geon 202 | 164 | G. |
| Dow 111-4 | 180 | B. |
| Exon 402 | 172 | F. |
| Vygen 120 | 190 | B. |
| Exon 925 | 170 | G. |
| Diamond PVC-25 | 180 | B. |
| Diamond 450 | 188 | B. |
| Diamond 500 | 192 | P. |
| Diamond DX-30 | 162 | E. |
| Diamond DX-35 | 170 | E. |
| Vygen 105 | 178 | G. |
| Vygen 161 | 182 | G. |
| Geon 101 EPF 21 | 190 | B. |
| Geon 118 | 186 | F-G. |
| VYNW-6 | 192 | E. |

Certain of the resins to which the invention is applicable were examined microscopically and the results of the examination are recorded in the following table:

TABLE III

*Observations of Microscopic Examination of Varied Vinyl Resins*

| Resin | Relative size | | Shape | Clarity of resin particle | Comments |
|---|---|---|---|---|---|
| | Largest | Average | | | |
| Dow 100-4 | 20 | 9 | Round | Opaque | |
| Geon 101 | 12 | 4 | do | Clear | |
| Opalon 300 FM | 20 | 8 | Not round | Opaque | |
| Marvinol VR-24 | 12 | 2 | Round | Clear | 60% large. |
| Exon 915 | 20 | 6 | Not round | Opaque | Some rod shaped. |
| Exon 905 | 18 | 2 | do | do | Do. |
| Exon 965 | 12 | 3 | Round | Clear | |
| Marvinol VR-26 | 5 | 3 | do | do | 90% small. |
| Marvinol MX-2401 | 10 | 3 | do | do | Do. |
| Geon 202 | 7 | 2 | do | do | All small. |
| Dow 111-4 | 20 | 10 | do | Opaque | |
| Exon 402 | 16 | 3 | do | do | |
| Vygen 120 | 12 | 7 | do | do | |
| Perles 1297.9 | 30 | 8 | do | do | |
| Exon 666 | 8 | 3 | do | do | |
| Marvinol VR-25 | 7 | 2 | do | Clear | |
| Diamond DX-35 | 20 | 10 | Not round | do | 90% big. |
| Diamond DX-30 | 7 | 4 | Round | do | All small. |
| Vygen 105 | 15 | 7 | Not round | Opaque | Some rod shaped 50% large. |
| Pliovic K-90 | 25 | 15 | Round | do | |
| VNYW-6 | 7 | 2 | Not round | do | |
| Marvinol VR-33 | | | do | Clear | Coagulum, all particles are loose agglomerates. |

Here the sizes are given on an arbitrary scale, the object being merely to record relative sizes.

The following table compares the volume shrinkage during fusion of various resins to which the invention is applicable; the resins being formulated as above but without any titanium dioxide.

TABLE IV

*Comparison of Volume Shrinkage During Fusion With Bulk Density of Blend*

| Resin | Percent shrinkage 420° F., 12 min. | Bulk density, g./cc. |
|---|---|---|
| Geon 118 | 80.2 | .350 |
| Vygen 161 | 78.1 | .375 |
| Marvinol VR-34 | 78.1 | .404 |
| Vygen 105 | 75.0 | .450 |
| VYNW-6 | 74.4 | .356 |
| Geon 101 | 74.4 | .478 |
| Geon 202 | 72.0 | .408 |
| PVC 500 | 71.4 | .545 |
| Exon 915 | 70.2 | .523 |
| Marvinol VR-24 | 69.5 | .466 |
| Exon 925 | 68.6 | .550 |
| Marvinol VR-26 | 67.4 | .521 |
| Exon 402 | 66.2 | .437 |
| DX-30 | 65.0 | .486 |
| Presto 325-40 | 65.2 | .528 |
| Insular 200 | 64.0 | .572 |
| PVC 450 | 63.2 | .503 |
| Vygen 120 | 62.8 | .647 |
| Pliovic K-90 | 62.2 | .561 |
| Geon 101EPF-21 | 62.2 | .573 |
| Marvinol MX-2491 | 62.5 | .544 |
| Insular 155 | 61.9 | .575 |
| Dow 100-4 | 61.0 | .533 |
| Opalon 300FM | 61.6 | .528 |
| Presto 315-40 | 61.0 | .555 |
| Dow 111-4 | 58.5 | .559 |
| Trulon 520 | 58.5 | |
| DX-35 | 57.0 | .641 |
| Escambia 1185 | 56.7 | |
| Escambia 1200 | 53.7 | .641 |

The percent shrinkage was determined by volume change determined by water displacements. The bulk density of the blend is given in grams per cc. as determined by ASTM D-392-38.

The mixing of the resin and plasticizer, and then the powdering additive, is carried out in a vessel in which there is no agitator. The resin, etc. are tumbled and mixed together by moving the vessel. Thus the vessel may be shaken, but preferably its contents are tumbled by rotating it on a tilted axis. The vessel may be generally cylindrical, but vessels of other shapes may be used.

The accompanying drawing illustrates quite schematically equipment that can be used. The vessel 5 is cylindrical. The mouth 6 is shown as open, but in practice may be closed, and the vessel will be provided with a vent for the air or other gas. Preferably the gas is introduced at one end of the vessel and vented from the other end. There is a bull ring 9 at the lower end of the vessel, driven by the gear 10, driven in turn by the motor 11. The top end of the vessel is supported by idler 12. The plasticizer is supplied by the pipe and spray nozzle 15. Air, or other gas (hot or cold) is shown as being supplied through the conduit 17, although the air is preferably introduced through appropriate means located at the bottom of the vessel.

The resin is added to the vessel in the form of a powder or agglomerates. The vessel is not filled more than about one-third full, so that as it is rotated on its tilted axis the contents are tumbled and thoroughly mixed. The resin is preheated or heated by hot air supplied through conduit 17. Hot air is supplied to the vessel during the solvation of the plasticizer, whether the resin has been preheated or not. The speed of solvation will depend upon the amount of plasticizer added and the temperature of the resin, and the temperature may be any temperature above 60° F. up to the maximum temperature above which degradation commences.

After the addition of the plasticizer is completed, tumbling is continued until solvation is complete. Then cold air is blown into the vessel while tumbling if the temperature is above about 250° F., and its contents are cooled to a temperature approaching room temperature, for example, a temperature between about 60° and about 250° F. Then, preferably without interrupting the tumbling action, the powdering additive is added. It may be added all at once. For example, inside of one minute, 5 pounds of powdering additive may be added to 100 pounds of resin-plasticizer mixture in a 150- to 200-gallon vessel tilted at an angle of 15 to 30 degrees and rotated at 20 to 60 revolutions per minute.

The following examples are illustrative. The drum and its contents are most efficiently heated or cooled by blowing air or other gas through the drum, such gas being at a temperature sufficiently higher or lower than the drum contents to produce the desired temperature change. Each of the products had a flow rate of over 5 cc. per second (ASTM D-392-38) and they are therefore described as free flowing.

EXAMPLE 1

One hundred parts (by weight) of Marvinol VR-24 was mixed for ten minutes in a heated drum tumbler at 170° F. to bring it to this temperature. To this was added 70 parts of di-2-ethylhexyl phthalate which had previously been heated to 170° F. The plasticizer was added over a period of 10 minutes. The resultant mix was tumbled for 20 minutes to permit solvation of the plasticizer in the resin, and then cooled for 10 minutes to room temperature. The resultant batch was a damp, sticky, somewhat granular mixture which possessed no free-flowing ability. To this there was added, all at once, as a powdering additive, 6 parts of Geon 121 (a high molecular-weight polyvinyl-chloride homopolymer which is an extremely small particle-size, dispersion grade resin). The particles or agglomerates of the mixture immediately disintegrated into a product which was extremely free-flowing and powdery.

Geon 121 is an emulsion polymer and a dispersion grade of vinyl resin not suited for preparation of dry blends.

EXAMPLE 2

One hundred parts (by weight) of Marvinol VR-24 was mixed in a heated drum at 170° F. for 10 minutes. To this was added 70 parts of tri-2-ethylhexyl phosphate preheated to 212° F. The blend was tumbled at 170° F. for 20 minutes and then cooled to room temperature. The resulting mixture was soft, fluffy, coherent, and had no tendency to free flow. Six parts of finely divided titanium dioxide was added, all at once. The resulting mixture was free flowing and powdery.

EXAMPLE 3

One hundred parts (by weight) of Marvinol VR-24 was tumbled in a heated drum at 190° F. for 10 minutes. To this was added, during ten minutes, 70 parts of Paraplex G-53, a high molecular-weight ester polyester-plasticizer manufactured by Rohm & Haas Co. and having a gravity of 1.08. The plasticizer had been preheated to 212° F. The resultant mixture was tumbled at 190° F. for 20 minutes and then cooled to room temperature. The resultant mixture was damp, spongy and heavy. To this mixture was added 6 parts of Pliovic AO (a copolymer of polyvinylchloride and diethyl maleate manufactured by The Goodyear Tire & Rubber Co., which is a dispersion grade resin which is ground to a very fine particle size when manufactured). The incorporation of this resin as a powdering additive converted the mixture to a free flowing and powdery product.

The blend of this example is illustrative of the more difficult materials from which to prepare a dry blend, due to the high viscosity and low solubility of Paraplex G-53. It is useful for electrical insulation, gaskets, etc., and is non-migrating, i.e. it will not soften painted surfaces or other forms of plastics with which it is brought into contact.

EXAMPLE 4

One hundred parts of Marvinol VR-24 was mixed at 190° F. for 10 minutes. To this was added 70 parts of di-2-ethylhexyl adipate (Adipol 2EH) which had been previously heated to 212° F. The plasticizer was added during a period of 10 minutes. The resultant mixture was tumbled at 190° F. for 20 minutes and then cooled to room temperature. The resultant mixture was fluffy and coherent with no free-flowing tendencies. To this was added, all at once, 6 parts of a finely divided precipitated calcium carbonate (Super Multifex). After mixing for 10 minutes this blend was free-flowing and powdery.

Other experiments were carried out in the same equipment using different resins, and adding 75 parts of butyl phthallyl butyl glycollate per 100 parts of the resin. The resin was first tumbled in the vessel for 10 minutes to bring it to a temperature of 170–210° F. For lower molecular weight resins 170° F. is satisfactory; for higher molecular weight resins 210° F. is recommended. The plasticizer was added over a period of 10 minutes, and the mixing was continued for another 20 minutes at about 170° F. About 3.5 percent of titanium dioxide was then added, all at once, as a powdering additive and in each case the mixture immediately became a free-flowing dry blend. Data on this treatment of the different resins is included in the following table:

TABLE V

| Resin | Average particle size, cm. | Before incorporating powdering additive | | After incorporating powdering additive | |
|---|---|---|---|---|---|
| | | Dry blend flow, sec./120 cc. | Dry blend bulk density, g./cc. | Dry blend flow, sec./120 cc. | Dry blend bulk density, g./cc. |
| Pearl-type resins of relatively high molecular weight: | | | | | |
| Dow 100-4 | .0153 | 20 | .371 | 7.5 | .550 |
| Geon | .0172 | WF | .319 | 12.0 | .528 |
| Escambia 1250 | .0174 | 22 | .348 | 7.0 | .510 |
| Escambia 2250 | .0177+ | 12 | .422 | 6.0 | .560 |
| Vygen 120 | .0122 | 24 | .378 | 6.0 | .560 |
| Opalon 300 FM | .0134 | 16 | .330 | 7.0 | .530 |
| Pearl-type resins of medium molecular weight: | | | | | |
| Dow 111-4 | .0103 | 18 | | 8.0 | .560 |
| Exon 915 | .0106 | WF | | 15.0 | .550 |
| Escambia 1225 | .0106 | 20 | | 6.0 | .585 |
| Diamond PVC-450 | .0136 | WF | | 10.0 | .520 |
| Pearl-type resins of low molecular weight: | | | | | |
| Escambia 1200 | .0163 | 17 | | 5.0 | .641 |
| Vygen 105 | .0103 | WF | | 20.0 | .470 |
| Diamond DX-35 | .0149 | WF | | 12.0 | .660 |
| Diamond DX-30 | .0138 | WF | | 20.0 | .670 |
| Pliovic S-50 | .0082 | WF | | 15.0 | .542 |
| Marvinol VR-24 | .0090 | WF | | 14.0 | .540 |
| Geon 202 | .0125 | WF | | 14.0 | .560 |

The dry blend densities were determined as described in ASTM D-392-38. The particle size was measured by U.S. Standard screen sizes. To determine the "dry blend flow," as there defined, a funnel was used as described in ASTM D-392-38 and the time required for 120 cc. of powder to flow through an orifice of ½ inch was measured. The letters "WF" mean that the powder has a flow rate of less than 5 cc. per second and wouldn't flow sufficiently fast for commercial use. Each of the resins treated is a polyvinyl chloride homopolymer except Geon 202 which is a copolymer of vinyl chloride and vinylidene chloride manufactured by The B. F. Goodrich Company. The table shows the effect of the powdering additive on the flowing properties of the different products, comparing the ability to flow before and after being treated with the powdering additive. For certain of the resins the bulk density is given both before and after adding the powdering additive because improvement in bulk density has been found to be a particularly good indication that a dry blend is obtained.

The examples are illustrative. Variations may be made in the procedure. For instance, the temperature at which the process is carried out will depend upon the melting point of the resin, etc. The powdering additive can be added all at once, or in increments or continuously—preferably during a brief period to economize time. Different types of tumbling equipment can be used, etc.

The invention is covered in the claims which follow. What I claim is:

1. The process of converting into powder with a flow rate in excess of 5 cc. per second, a blend of a resin powder or aggregate and sufficient plasticizer to give a damp, particulate mass with a blend flow rate substantially less than 5 cc. per second, which resin is selected from the class consisting of pearl-type, extrusion-grade polymers of vinyl chloride, utilizing in the process a powdered additive selected from the class consisting of organic and inorganic solids so finely divided as to pass through a 150-mesh screen, said inorganic additives being amorphous as opposed to crystalline, and being no more than one-tenth of one percent soluble in water, and said organic additives being less than substantially 5 percent soluble in the plasticizer at room temperature, 5 parts of which organic additives when dispersed in 100 parts of said plasticizer form suspensions which are stable and remain opaque on standing; which process comprises mixing said additive and the plasticized resin and continuing the mixing until the mixture is converted into a finely divided powder with a flow rate in excess of 5 cc. per second.

2. The process of converting into powder with a flow rate in excess of 5 cc. per second, a blend of plasticizer and a resin selected from the class consisting of pearl-type, extrusion-grade polymers of vinyl chloride, which process comprises solvating plasticizer into the resin with heat in an amount sufficient to result in a damp, particulate blend which has a flow rate substantially less than 5 cc. per second, and then cooling the plasticized resin and with the resin temperature between room temperature and 250° F., mixing with it a powdering additive selected from the class consisting of organic and inorganic solids so finely divided as to pass through a 150-mesh screen, said inorganic additives being amorphous as opposed to crystalline, and being no more than one-tenth of one percent soluble in water, and said organic additives being less than substantially 5 percent soluble in the plasticizer at room temperature, 5 parts of which organic additives when dispersed in 100 parts of said plasticizer form suspensions which are stable and remain opaque on standing, said mixing of said additive into the plasticized resin being continued until the mixture is converted into a finely divided powder with a flow rate in excess of 5 cc. per second.

3. The process of claim 2 in which all of the steps of the process are carried out within one vessel and heat is supplied from heated gas within the vessel and the contents of the vessel are cooled by transfer of heat to a gas within the vessel.

4. The process of claim 1 in which the powdering additive is a polyvinyl chloride homopolymer prepared by emulsion polymerization.

References Cited in the file of this patent

UNITED STATES PATENTS

| | | |
|---|---|---|
| 2,056,796 | Macht et al. | Oct. 6, 1936 |
| 2,835,620 | Bartlett | May 20, 1958 |
| 2,958,669 | Hoffman | Nov. 1, 1960 |

OTHER REFERENCES

Chemical Engineering, June 1954, pages 210–217.

UNITED STATES PATENT OFFICE
CERTIFICATE OF CORRECTION

Patent No. 3,090,763                         May 21, 1963

Edward L. Hillier

It is hereby certified that error appears in the above numbered patent requiring correction and that the said Letters Patent should read as corrected below.

Column 3, line 55, for "$Fe_2O_2.H_2O$" read -- $Fe_2O_3.H_2O$ --; columns 7 and 8, Table I, under the column heading "Surface area, sq. cm./g.", ten lines from the bottom, for "178" read -- .78 --; column 7, line 62, for "Uultramarine" read -- Ultramarine --; column 12, Table V, first column, line 5 thereof, for "Geon" read -- Geon 101 --.

Signed and sealed this 3rd day of December 1963.

(SEAL)
Attest:
ERNEST W. SWIDER

Attesting Officer

EDWIN L. REYNOLDS

Acting Commissioner of Patents